US010268926B2

(12) United States Patent
Feng et al.

(10) Patent No.: US 10,268,926 B2
(45) Date of Patent: Apr. 23, 2019

(54) METHOD AND APPARATUS FOR PROCESSING POINT CLOUD DATA (71) Applicant: BEIJING BAIDU NETCOM SCIENCE AND TECHNOLOGY CO., LTD., Beijing (CN)

(72) Inventors: Kaiwen Feng, Beijing (CN); Zhuo Chen, Beijing (CN); Bocong Liu, Beijing (CN); Yibing Liang, Beijing (CN); Yu Ma, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/410,713

(22) Filed: Jan. 19, 2017

(65) Prior Publication Data
US 2018/0089536 A1 Mar. 29, 2018

(30) Foreign Application Priority Data
Sep. 27, 2016 (CN) .......................... 2016 1 0855546

(51) Int. Cl.
G06K 9/62 (2006.01)
G01S 17/02 (2006.01)
(Continued)

(52) U.S. Cl.
CPC .......... *G06K 9/6254* (2013.01); *G01S 7/4808* (2013.01); *G01S 17/023* (2013.01);
(Continued)

(58) Field of Classification Search
CPC .......... G06K 9/00805; G06K 9/00201; G06K 9/00637; G06K 9/00704; G06K 9/00791;
(Continued)

(56) References Cited

U.S. PATENT DOCUMENTS

2010/0034426 A1* 2/2010 Takiguchi .......... G01C 21/3602
382/106
2011/0164037 A1* 7/2011 Yoshida .................. G06T 15/08
345/419
(Continued)

OTHER PUBLICATIONS

Sensor fusion for semantic segmentation of urban scenes Richard Zhang; Stefan A. Candra; Kai Vetter; Avideh Zakhor 2015 IEEE International Conference on Robotics and Automation (ICRA) Year: 2015 pp. 1850-1857.*

(Continued)

Primary Examiner — Kim Y Vu
Assistant Examiner — Michael J Vanchy, Jr.
(74) Attorney, Agent, or Firm — Marshall, Gerstein & Borun LLP (57) ABSTRACT The present application discloses a method and an apparatus for processing point cloud data. The method in an embodiment comprises: presenting a to-be-labeled point cloud frame and a camera image formed by photographing an identical scene at an identical moment as the point cloud frame; determining, in response to an operation of selecting an object in the point cloud frame by a user, an area encompassing the selected object in the point cloud frame; projecting the area from the point cloud frame to the camera image, to obtain a projected area in the camera image; and adding a mark in the projected area, for labeling, by the user, the selected object in the point cloud frame according to the mark indicating an object in the camera image. This implementation can assist labeling personnel in rapidly and correctly labeling an object in a point cloud frame.

11 Claims, 5 Drawing Sheets (51) Int. Cl.
*G06K 9/20* (2006.01)
*G06K 9/00* (2006.01)
*G01S 17/89* (2006.01)
*G01S 7/48* (2006.01)

(52) U.S. Cl.
CPC .......... *G01S 17/89* (2013.01); *G06K 9/00805* (2013.01); *G06K 9/2081* (2013.01); *G06K 9/6256* (2013.01)

(58) Field of Classification Search
CPC .. G06K 9/6211; G06K 9/6293; G05D 1/0238; G05D 2201/0213; G01C 11/02; G01C 21/005; G06T 19/006; G06T 2207/10028; G06T 2207/30252; G06T 2219/004; G06T 7/521; G08G 1/165; G08G 1/166; G08G 1/16

See application file for complete search history.

(56) References Cited

U.S. PATENT DOCUMENTS

2012/0069012 A1* 3/2012 Facchin ................. G01C 11/02 345/419
2012/0316784 A1* 12/2012 Chrysanthakopoulos ................... G01C 21/005 701/519

OTHER PUBLICATIONS

Chinese Office Action for Application No. 103093191, dated Aug. 23, 2018.

* cited by examiner

METHOD AND APPARATUS FOR PROCESSING POINT CLOUD DATA

CROSS-REFERENCE TO RELATED APPLICATION

This application is related to and claims priority from Chinese application No. 201610855546.4, filed on Sep. 27, 2016, entitled "Method and Apparatus for Processing Point Cloud Data", the entire disclosure of which is hereby incorporated by reference.

TECHNICAL FIELD

The present application relates to the field of computer technologies, in particular, to the field of data processing technologies, and more particularly to a method and an apparatus for processing point cloud data.

BACKGROUND

When training a recognition algorithm for point cloud data, a large volume of labeled point cloud data needs to be used as training samples. Therefore, it is necessary to collect a large volume of point cloud data in different scenarios in advance and correctly label the data, such that a smooth optimization process can be guaranteed. In the prior art, the collected point cloud data is generally labeled manually.

However, characteristics presented by objects in a point cloud are often not distinctive, and affected by the ground and other sundries as well. When faced with a large volume of data to be labeled and using manual labeling, the labeling is relatively slow, and objects with similar features may easily be labeled incorrectly.

SUMMARY

An objective of the present application is to provide an improved method and apparatus for processing point cloud data, to solve the technical problems mentioned in the background.

In the first aspect, the present application provides a method for processing point cloud data, comprising: presenting a to-be-labeled point cloud frame and a camera image formed by photographing an identical scene at an identical moment as the point cloud frame; determining, in response to an operation of selecting an object in the point cloud frame by a user, an area encompassing the selected object in the point cloud frame; projecting the area from the point cloud frame to the camera image, to obtain a projected area in the camera image; and adding a mark in the projected area, for labeling, by the user the selected object in the point cloud frame according to the mark indicating an object in the camera image.

In some embodiments, the method further comprises: generating, in response to the labeling, by the user, the selected object in the point cloud frame according to the mark, a labeled point cloud frame according to operation information of the labeling.

In some embodiments, the method further comprises: training an obstacle recognition algorithm by using the labeled point cloud frame as sample data, to update the obstacle recognition algorithm.

In some embodiments, the presenting a to-be-labeled point cloud frame and a camera image formed by photographing an identical scene at an identical moment as the point cloud frame comprises: saving a to-be-labeled point cloud frame in the point cloud data as a point cloud file; and loading the point cloud file by using a point cloud visual tool, to present the point cloud frame in the point cloud visual tool.

In some embodiments, the presenting a to-be-labeled point cloud frame and a camera image formed by photographing an identical scene at an identical moment as the point cloud frame further comprises: loading an image file corresponding to the camera image by using the point cloud visual tool, to present the camera image in the point cloud visual tool.

In the second aspect, the present application provides an apparatus for processing point cloud data, comprising: a presenting unit, configured to present a to-be-labeled point cloud frame and a camera image formed by photographing an identical scene at an identical moment as the point cloud frame; a determining unit, configured to determine, in response to an operation of selecting an object in the point cloud frame by a user, an area encompassing the selected object in the point cloud frame; a projecting unit, configured to project the area from the point cloud frame to the camera image, to obtain a projected area in the camera image; and a marking unit, configured to add a mark in the projected area, for labeling, by the user the selected object in the point cloud frame according to the mark indicating an object in the camera image.

In some embodiments, the apparatus further comprises: a generating unit, configured to generate, in response to the labeling, by the user, the selected object in the point cloud frame according to the mark, a labeled point cloud frame according to operation information of the labeling.

In some embodiments, the apparatus further comprises: a training unit, configured to train an obstacle recognition algorithm by using the labeled point cloud frame as sample data, to update the obstacle recognition algorithm.

In some embodiments, the presenting unit is configured to: save a to-be-labeled point cloud frame in the point cloud data as a point cloud file; and load the point cloud file by using a point cloud visual tool, to present the point cloud frame in the point cloud visual tool.

In some embodiments, the presenting unit is further configured to: load an image file corresponding to the camera image by using the point cloud visual tool, to present the camera image in the point cloud visual tool.

The method and apparatus for processing point cloud data of the present application combine point cloud data and camera data of the identical moment via a projection technique from three-dimensional data to two-dimensional data, and with such a feature that objects in the camera image are easy to recognize, help labeling personnel rapidly and correctly label objects, which avoids the incorrect labeling of object types while improving the labeling efficiency, thus ensuring the correctness of labeled data.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
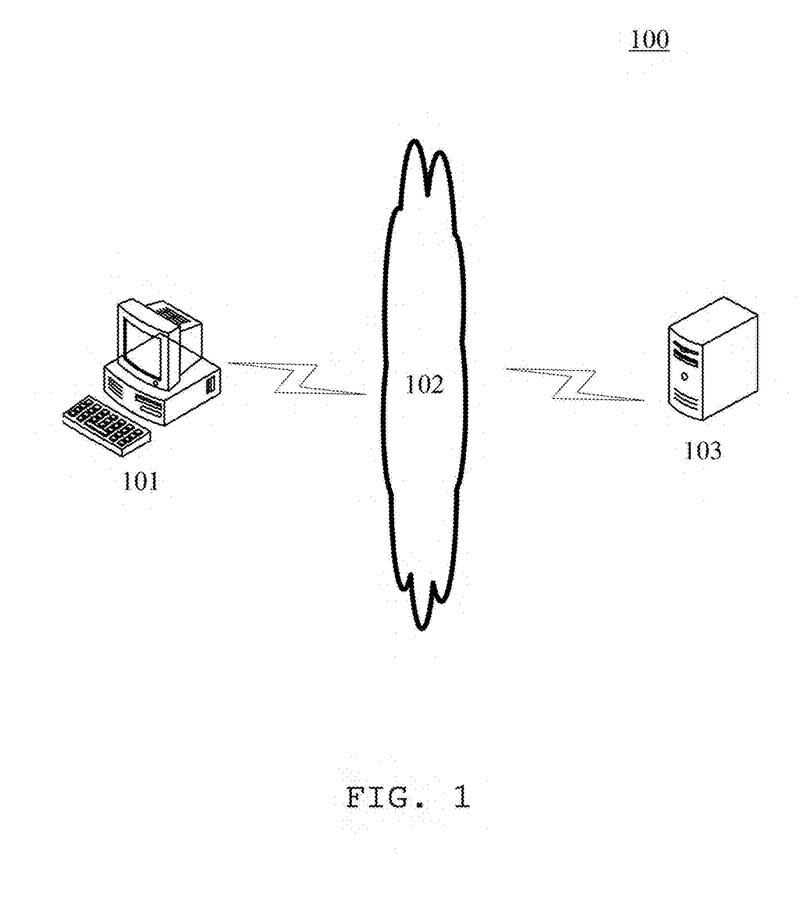
FIG. 1 is a diagram showing an exemplary system architecture in which the present application can be applied.

FIG. 1 shows an exemplary system architecture 100 in which an embodiment of a method or an apparatus for processing point cloud data according to the present application can be applied.

As shown in FIG. 1, the system architecture 100 may comprise a terminal device 101, a network 102, and a server 103. The network 102 is configured to provide a medium of a communication link between the terminal device 101 and the server 103. The network 102 may comprise various connection types, such as wired and wireless communication links or optical fiber cables.

A user may use the terminal device 101 to interact with the server 103 via the network 102, to receive or send messages, and the like. Various communication client applications such as a point cloud visual tool may be installed on the terminal device 101.

The terminal device 101 may be various electronic devices having a display screen and supporting running of the point cloud visual tool, and comprise but not limited to a laptop portable computer, a desktop computer, and the like.

The server 103 may be a server providing various services, for example, a backend server that supports information displayed on the terminal device 101. The backend server may perform processing such as analysis on received data, and feed back the processing result to the terminal device.

It should be noted that, the method for processing point cloud data provided by the embodiment of the present application is generally executed by the terminal device 101, and correspondingly, the apparatus for processing point cloud data is generally disposed in the terminal device 101.

It should be understood that, the numbers of the terminal devices, the networks, and the servers in FIG. 1 are merely illustrative. According to implementation needs, any number of terminal devices, networks, and servers may be provided.

Figure 2:
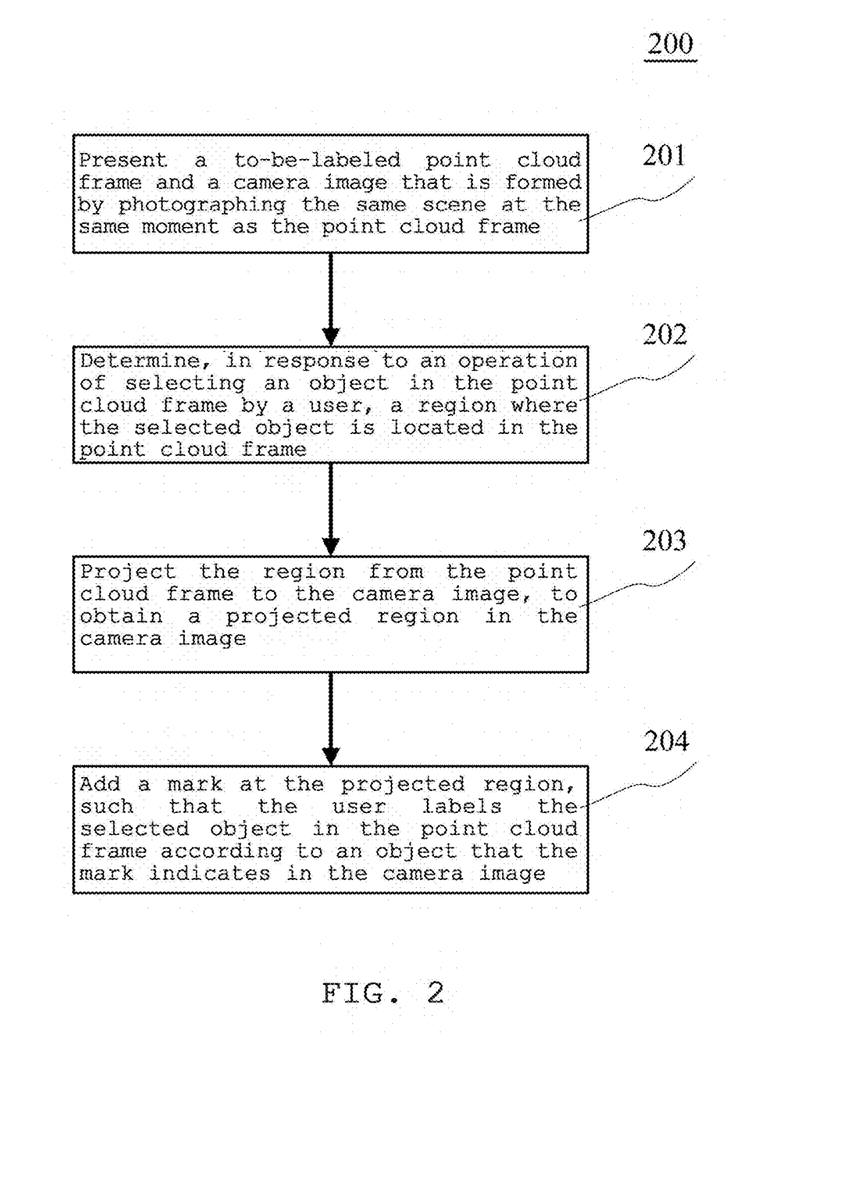
FIG. 2 is a flow chart of an embodiment of a method for processing point cloud data according to the present application.

Continue to refer to FIG. 2, which shows a procedure 200 of an embodiment of a method for processing point cloud data according to the present application. The method for processing point cloud data comprises the following steps:

Step 201, a to-be-labeled point cloud frame and a camera image formed by photographing an identical scene at an identical moment as the point cloud frame are presented.

In this embodiment, a point cloud visual tool may be pre-installed on an electronic device (for example, the terminal device shown in FIG. 1) on which the method for processing point cloud data runs. The point cloud visual tool may be an application program that supports three-dimensional presentation and labeling of a point cloud frame. The point cloud visual tool may be installed and deployed on the electronic device after the electronic device acquires an installation file of the point cloud visual tool from the server in a wired connection manner or a wireless communication manner.

The electronic device may present a to-be-labeled point cloud frame by using the installed point cloud visual tool, and the user may use the presented point cloud frame to label an object therein in a subsequent process. In addition, the point cloud visual tool needs to support presentation of a two-dimensional image, such that the electronic device can further use the point cloud visual tool to present a camera image. The camera image is formed by photographing an identical scene at an identical moment as the point cloud frame. That is, the point cloud frame and the camera image collect data of the identical scene.

Step 202, in response to an operation of selecting an object in the point cloud frame by the user, an area encompassing the selected object in the point cloud frame is determined.

In this embodiment, the point cloud visual tool has a function of labeling an object in a point cloud, such that the user selects, in the point cloud frame presented by the point cloud visual tool, an object that needs to be labeled. Therefore, the electronic device may detect an operation of selecting an object in the point cloud frame by the user. When this operation is detected, the electronic device can determine an area encompassing the selected object in the point cloud frame. Generally, the area may be represented by using three-dimensional coordinates of points in the area.

Step 203, the area is projected from the point cloud frame to the camera image, to obtain a projected area in the camera image.

In this embodiment, based on the area of the selected object in the point cloud frame determined in step 202, the electronic device may project the area to the camera image according to a coordinate mapping relation between the point cloud frame and the camera image, to obtain the projected area. The coordinate mapping relation, which is a mapping relation from three-dimensional coordinates to two-dimensional coordinates, may be determined according to parameters of a LIDAR used for collecting the point cloud data and parameters of a camera for taking the camera image, or may be calculated in advance according to defined point cloud data and coordinates of a corresponding object in the camera image.

Step 204, a mark is added in the projected area, for labeling, by the user the selected object in the point cloud frame according to the mark indicating an object in the camera image.

In this embodiment, based on the projected area obtained in step 203, the electronic device may add a mark in the projected area, such that the user can recognize the object that the mark indicates in the camera image. Based on the coordinate mapping relation between the point cloud frame and the camera image, it can be learned that the object indicated by the mark and the selected object in the point cloud frame are corresponding to the identical object in reality, and therefore after identifying the object type of the object that the mark indicates in the camera image, the user can use the object type as the object type of the selected object in the point cloud frame, thus completing labeling the selected object.

In some optional implementations of this embodiment, the foregoing method further comprises: generating, in response to the labeling by the user on the selected object in the point cloud frame, a labeled point cloud frame according to operation information of the labeling. In this implementation, the user may carry out the labeling on the selected object in the point cloud frame according to the mark indicating the object. The electronic device may detect the labeling, and when the labeling is detected, the electronic device may generate a labeled point cloud frame according to operation information of the labeling. For example, the object that the mark indicates in the camera image is an image of a human being, the user may carry out the labeling according to the mark. When the operation information of the labeling is labeling the selected object of the point cloud frame as a human being, the electronic device can label the selected object in the generated labeled point cloud frame as a human being.

In some optional implementations of this embodiment, the method further comprises: training an obstacle recognition algorithm by using the labeled point cloud frame as sample data, to update the obstacle recognition algorithm. An important application of the labeled point cloud frame is to be used as a training sample for computation models related to the point cloud. In this embodiment, the labeled point cloud frame may be used as sample data for training an obstacle recognition algorithm, to update the obstacle recognition algorithm.

In some optional implementations of this embodiment, the step 201 comprises: saving a to-be-labeled point cloud frame in the point cloud data as a point cloud file; and loading the point cloud file by using a point cloud visual tool, to present the point cloud frame in the point cloud visual tool. The electronic device may first save each to-be-labeled point cloud frame in the point cloud data, which is collected by a laser sensor, as a point cloud file. In practice, when the point cloud file is saved, the point cloud frame may be exported via an exporting program, to obtain an exported file. The exported point cloud file generally needs to have a file format supported by the point cloud visual tool. After that, the electronic device loads the point cloud file by using the point cloud visual tool, to present the point cloud frame in the point cloud visual tool.

In some optional implementations of the foregoing implementation, the step 201 further comprises: loading an image file corresponding to the camera image by using the point cloud visual tool, to present the camera image in the point cloud visual tool.

Optionally, the to-be-labeled point cloud frame and the camera image may be taken by using a vehicle-mounted LIDAR and a vehicle-mounted camera of a vehicle respectively. In this implementation, the collected data is as close as possible to data collected by the vehicle in an actual traveling process in terms of angle, so that the labeled point cloud frame can be used as a sample for training a point cloud recognition algorithm of an unmanned vehicle.

Figure 3:
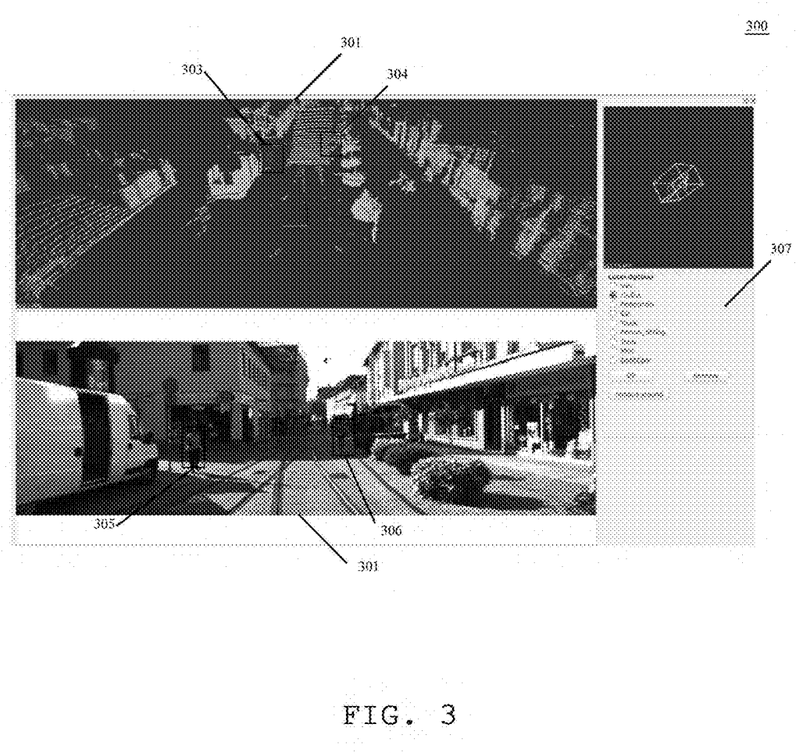
FIG. 3 is a schematic diagram of an application scenario of a method for processing point cloud data according to the present application.

Continue to refer to FIG. 3. FIG. 3 is a schematic diagram of an application scenario of a method for processing point cloud data according to this embodiment. In the application scenario of FIG. 3, a user may export each point cloud frame in point cloud data as a point cloud file by using an exporting program of a terminal device. Secondly, the user may load the point cloud file by using a point cloud visual tool of the terminal device, so that the terminal device presents a to-be-labeled point cloud frame via the point cloud visual tool, as shown by an area 301 in FIG. 3. In addition, the user may further load a camera image by using the point cloud visual tool of the terminal device, to present the camera image via the point cloud visual tool, as shown by the area 302 in FIG. 3. After that, the user may select, in the area 301, a selected object 303 and a selected object 304 that need to be labeled. The electronic device may determine an area encompassing the selected objects in a point cloud, and project the area to the camera image presented in the area 302, such that a frame 305 and a frame 306 used as marks are added to the camera image presented in the area 302. Then, the user can recognize that the object in the frame 305 is a pedestrian and the object in the frame 306 is a cyclist, thus executing the labeling in an area 307 according to the recognition result, and using the recognition result as input information to be input to the point cloud visual tool. Finally, the terminal device can label, according to the input information, the selected object 303 and the selected object 304 in the point cloud frame as a pedestrian and a cyclist respectively.

The method provided by the foregoing embodiment of the present application combines point cloud data and camera data of the identical moment via a projection technique from three-dimensional data to two-dimensional data. With such a feature that objects in the camera image are easy to recognize, labeling personnel can rapidly and correctly label objects, which reduces the probability of incorrect labeling of object types while improving the labeling efficiency, thus ensuring the correctness of labeled data.

Figure 4:
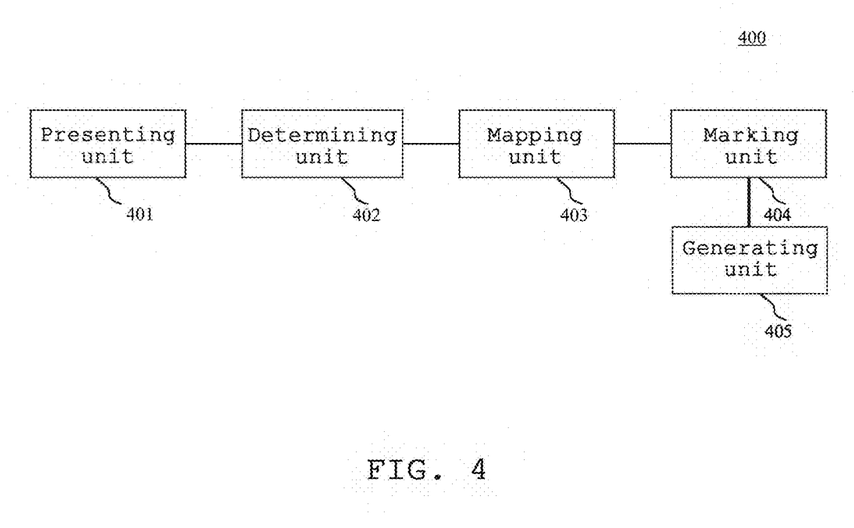
FIG. 4 is a schematic structural diagram of an embodiment of an apparatus for processing point cloud data according to the present application.

Further referring to FIG. 4, as an implementation of the method shown in the figures above, the present application provides an embodiment of an apparatus for processing point cloud data. The apparatus embodiment corresponds to the method embodiment shown in FIG. 2, and the apparatus can be specifically applied in various terminal devices.

As shown in FIG. 4, the apparatus 400 for processing point cloud data of this embodiment comprises: a presenting unit 401, a determining unit 402, a projecting unit 403, and a marking unit 404. The presenting unit 401 is configured to present a to-be-labeled point cloud frame and a camera image formed by photographing an identical scene at an identical moment as the point cloud frame. The determining unit 402 is configured to determine, in response to an operation of selecting an object in the point cloud frame by a user, an area encompassing the selected object in the point cloud frame. The projecting unit 403 projects the area from the point cloud frame to the camera image, to obtain a projected area in the camera image. The marking unit 404 adds a mark in the projected area, for labeling, by the user the selected object in the point cloud frame according to the mark indicating an object in the camera image.

In this embodiment, for specific processing of the presenting unit 401, the determining unit 402, the projecting unit 403, and the marking unit 404 of the apparatus 400 for processing point cloud data, refer to step 201, step 202, step 203, and step 204 in the embodiment corresponding to FIG. 2, and details are not repeated herein.

In some optional implementations of this embodiment, the apparatus 400 further comprises: a generating unit 405, configured to generate, in response to the labeling by the user on the selected object in the point cloud frame according to the mark, a labeled point cloud frame according to operation information of the labeling.

In some optional implementations of this embodiment, the apparatus 400 further comprises: a training unit (not shown), configured to train an obstacle recognition algorithm by using the labeled point cloud frame as sample data, to update the obstacle recognition algorithm. For specific processing of this implementation, refer to corresponding implementation in the embodiment corresponding to FIG. 2, and details are not repeated herein.

In some optional implementations of this embodiment, the presenting unit 401 is configured to: save a to-be-labeled point cloud frame in the point cloud data as a point cloud file; and load the point cloud file by using a point cloud visual tool, to present the point cloud frame in the point cloud visual tool. For specific processing of this implementation, refer to corresponding implementation in the embodiment corresponding to FIG. 2, and details are not repeated herein.

In some optional implementations of this embodiment, the presenting unit 401 is further configured to: load an image file corresponding to the camera image by using the point cloud visual tool, to present the camera image in the point cloud visual tool. For specific processing of this implementation, refer to corresponding implementation in the embodiment corresponding to FIG. 2, and details are not repeated herein.

Figure 5:
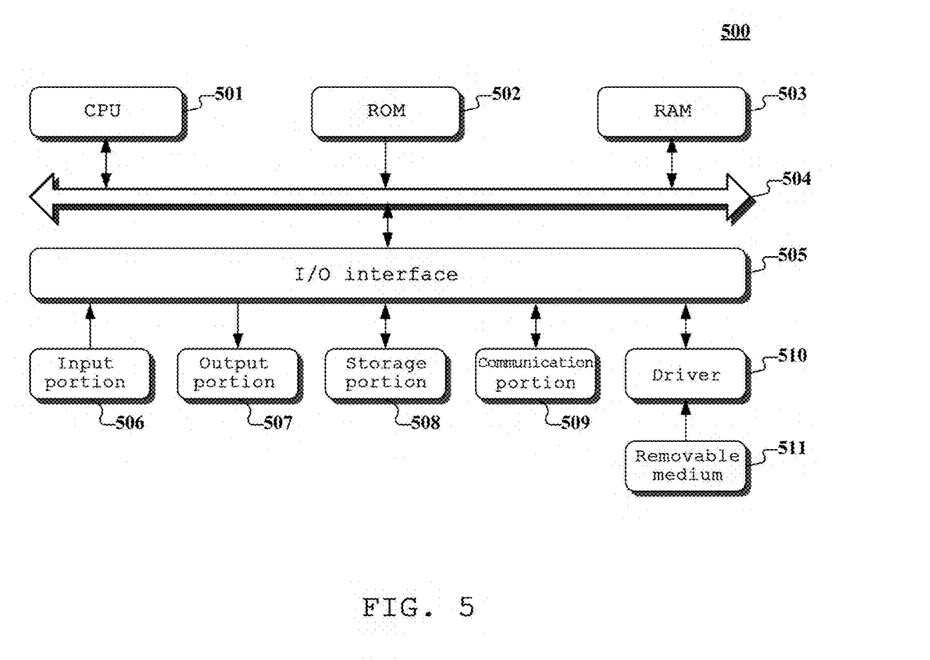
FIG. 5 is a schematic structural diagram of a computer system of a terminal device or server suitable for implementing the embodiment of the present application.

Referring to FIG. 5, a schematic structural diagram of a computer system 500 adapted to implement a terminal device or a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 600. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method as shown in the flowcharts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a presenting unit, a determining unit, a projecting unit and a marking unit, where the names of these units are not considered as a limitation to the units. For example, the presenting unit may also be described as "a unit for presenting a to-be-labeled point cloud frame and a camera image formed by photographing an identical scene at an identical moment as the point cloud frame".

In another aspect, the present application further provides a non-transitory computer readable storage medium. The non-transitory computer readable storage medium may be the non-transitory computer readable storage medium included in the apparatus in the above embodiments, or a stand-alone non-transitory computer readable storage medium which has not been assembled into the apparatus. The non-transitory computer readable storage medium stores one or more programs. When the one or more programs are executed by a device, the device is to: presenting a to-be-labeled point cloud frame and a camera image formed by photographing an identical scene at an identical moment as the point cloud frame; determining, in response to an operation of selecting an object in the point cloud frame by a user, an area encompassing the selected object in the point cloud frame; projecting the area from the point cloud frame to the camera image, to obtain a projected area in the camera image; and adding a mark in the projected area, for labeling, by the user the selected object in the point cloud frame according to the mark indicating an object in the camera image.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for processing point cloud data, comprising:
displaying a to-be-labeled point cloud frame within an interface;

displaying a camera image formed by photographing an identical scene at an identical moment as the point cloud frame within the interface, the to-be-labeled point cloud frame being non-superimposed to the camera image;

determining, in response to an operation of selecting a displayed object in the point cloud frame by a user, an area encompassing the selected object in the point cloud frame;

projecting the area from the point cloud frame to the camera image, to obtain a projected area in the camera image;

displaying a mark in the projected area, for labeling, by the user, the selected object in the point cloud frame according to the mark indicating an object in the camera image; and displaying simultaneously (i) the to-be-labeled point cloud frame, (ii) the camera image, and (iii) label options for labeling the displayed object in the to-be-labeled point cloud frame within the interface, wherein the displayed to-be-labeled point cloud frame, the displayed camera image and the displayed label options are non-superimposed to each other.

2. The method according to claim 1, further comprising:
generating, in response to the labeling, by the user, the selected object in the point cloud frame according to the mark, a labeled point cloud frame according to operation information of the labeling.

3. The method according to claim 2, further comprising:
training an obstacle recognition algorithm by using the labeled point cloud frame as sample data, to update the obstacle recognition algorithm.

4. The method according to claim 1, wherein the displaying the to-be-labeled point cloud frame within the interface and displaying the camera image formed by photographing an identical scene at an identical moment as the point cloud frame within the interface comprises:
saving a to-be-labeled point cloud frame in the point cloud data as a point cloud file; and
loading the point cloud file by using a point cloud visual tool, to display the point cloud frame in the point cloud visual tool.

5. The method according to claim 4, wherein the displaying the to-be-labeled point cloud frame within the interface and displaying the camera image formed by photographing an identical scene at an identical moment as the point cloud frame within the interface further comprises:
loading an image file corresponding to the camera image by using the point cloud visual tool, to display the camera image in the point cloud visual tool.

6. An apparatus for processing point cloud data, comprising:
at least one processor; and
a memory storing instructions, which when executed by the at least one processor, cause the at least one processor to perform operations, the operations comprising:
displaying a to-be-labeled point cloud frame within an interface;
displaying a camera image formed by photographing an identical scene at an identical moment as the point cloud frame within the interface, the to-be-labeled point cloud frame being non-superimposed to the camera image;

determining, in response to an operation of selecting a displayed object in the point cloud frame by a user, an area encompassing the selected object in the point cloud frame;

projecting the area from the point cloud frame to the camera image, to obtain a projected area in the camera image;

displaying a mark in the projected area, for labeling, by the user, the selected object in the point cloud frame according to the mark indicating an object in the camera image; and displaying simultaneously (i) the to-be-labeled point cloud frame, (ii) the camera image and (iii) label options for labeling the displayed object in the to-be-labeled point cloud frame within the interface, wherein the displayed to-be-labeled point cloud frame, the displayed camera image and the displayed label options are non-superimposed to each other.

7. The apparatus according to claim 6, wherein the operations further comprise:
generating, in response to the labeling by the user on the selected object in the point cloud frame according to the mark, a labeled point cloud frame according to operation information of the labeling.

8. The apparatus according to claim 7, wherein the operations further comprise:
training an obstacle recognition algorithm by using the labeled point cloud frame as sample data, to update the obstacle recognition algorithm.

9. The apparatus according to claim 6, wherein the displaying the to-be-labeled point cloud frame within the interface and displaying the camera image formed by photographing an identical scene at an identical moment as the point cloud frame within the interface comprises:
saving a to-be-labeled point cloud frame in the point cloud data as a point cloud file; and
loading the point cloud file by using a point cloud visual tool, to display the point cloud frame in the point cloud visual tool.

10. The apparatus according to claim 9, wherein the displaying the to-be-labeled point cloud frame within the interface and displaying the camera image formed by photographing an identical scene at an identical moment as the point cloud frame within the interface further comprises:
loading an image file corresponding to the camera image by using the point cloud visual tool, to display the camera image in the point cloud visual tool.

11. A non-transitory storage medium storing one or more programs, the one or more programs when executed by an apparatus, causing the apparatus to perform a method for processing point cloud data, comprising:
displaying a to-be-labeled point cloud frame within an interface;
displaying a camera image formed by photographing an identical scene at an identical moment as the point cloud frame within the interface, the to-be-labeled point cloud frame being non-superimposed to the camera image;

determining, in response to an operation of selecting a displayed object in the point cloud frame by a user, an area encompassing the selected object in the point cloud frame;

projecting the area from the point cloud frame to the camera image, to obtain a projected area in the camera image;

displaying-a mark in the projected area, for labeling, by the user, the selected object in the point cloud frame according to the mark indicating an object in the camera image; and displaying simultaneously (i) the to-be-labeled point cloud frame, (ii) the camera image, and (iii) label options for labeling the displayed object in the to-be-labeled point cloud frame within the interface, wherein the displayed to-be-labeled point cloud frame, the displayed camera image and the displayed label options are non-superimposed to each other.

* * * * *